United States Patent [19]

King et al.

[11] Patent Number: 5,723,956
[45] Date of Patent: Mar. 3, 1998

[54] LOW COST ELECTRONIC ULTRACAPACITOR INTERFACE TECHNIQUE TO PROVIDE LOAD LEVELING OF A BATTERY FOR PULSED LOAD OR MOTOR TRACTION DRIVE APPLICATIONS

[75] Inventors: Robert Dean King, Schenectady, N.Y.; Rik Wivina Anna Adelson DeDoncker, Malvern, Pa.

[73] Assignee: General Electric Company, Schenectady, N.Y.

[21] Appl. No.: 654,476

[22] Filed: May 28, 1996

[51] Int. Cl.$^6$ .............................. H02M 7/53; H02P 7/01
[52] U.S. Cl. .................. 318/139; 318/440; 318/500; 307/44; 307/72; 323/223; 323/230; 323/282
[58] Field of Search ........................... 318/139, 440, 318/442, 500, 504; 307/43–46, 72, 74, 75; 323/220, 223, 224, 225, 229, 230, 233, 265, 282

[56] References Cited

U.S. PATENT DOCUMENTS

| | | | |
|---|---|---|---|
| 5,047,913 | 9/1991 | DeDoncker et al. | 363/95 |
| 5,260,637 | 11/1993 | Pizzi | 320/6 |
| 5,373,195 | 12/1994 | DeDoncker et al. | 307/45 |
| 5,591,212 | 1/1997 | Keimel | 607/5 |

OTHER PUBLICATIONS

Design Methodologies For Soft Switched Inverters; D.M. Divan, G. Venkataramanan, R.W. DeDoncker; 1988 IEEE pp. 758–766, 88CH2565.

*Primary Examiner*—Bentsu Ro
*Attorney, Agent, or Firm*—Marvin Snyder

[57] ABSTRACT

A battery load leveling arrangement for an electrically powered system in which battery loading is subject to intermittent high current loading utilizes a passive energy storage device and a diode connected in series with the storage device to conduct current from the storage device to the load when current demand forces a drop in battery voltage. A current limiting circuit is connected in parallel with the diode for recharging the passive energy storage device. The current limiting circuit functions to limit the average magnitude of recharge current supplied to the storage device. Various forms of current limiting circuits are disclosed, including a PTC resistor coupled in parallel with a fixed resistor. The current limit circuit may also include an SCR for switching regenerative braking current to the device when the system is connected to power an electric motor.

12 Claims, 3 Drawing Sheets

LOW COST ELECTRONIC ULTRACAPACITOR INTERFACE TECHNIQUE TO PROVIDE LOAD LEVELING OF A BATTERY FOR PULSED LOAD OR MOTOR TRACTION DRIVE APPLICATIONS

U.S. Government has a paid-up license in this invention and the right in limited circumstances to require the patent owner to license others on reasonable terms as provided for by the terms of Contract No.: DEAC07-76-ID01570 awarded by the U.S. Depart of Energy.

BACKGROUND OF THE INVENTION

This invention relates to electric drive systems and, more particularly, to battery powered drive systems such as are used in battery powered electric vehicles.

Electric vehicle systems currently in use and in development utilize rechargeable batteries, typically lead-acid batteries, to provide electric power for vehicle propulsion. The batteries are connected to a direct current (DC) link which connects to a power control circuit such as a pulse width modulation (PWM) circuit for controlling power to a DC motor or to a frequency controlled inverter for controlling power to an alternating current (AC) motor. The motor, either AC or DC, is coupled in driving relationship to one or more wheels of the vehicle, either in a direct drive arrangement or through an appropriate transmission. Some vehicles are hybrids and include small internal combustion engines which can be used to supplement battery power.

In the operation of an electric vehicle, the battery is often called upon to deliver short bursts of power at high current levels, typically during acceleration of the vehicle. When high current is drawn from conventional batteries, battery terminal voltage drops. Such voltage reduction can interfere with proper operation or reduce efficiency of the switching devices in the power control circuit since the control circuit must be designed to operate at high efficiency at full battery voltage, i.e., when the vehicle is drawing nominal current in a constant speed mode.

One method for reducing the effect of high current requirements on electric drive system batteries is to use an auxiliary passive energy storage device coupled to the DC link such that the device can provide additional power during high current situations. One implementation of this method is shown in U.S. Pat. No. 5,373,195 issued Dec. 13, 1994 and assigned to General Electric Co., the disclosure of which is hereby incorporated by reference. This prior patent describes an auxiliary passive energy storage device which may comprise an ultracapacitor or a magnetic energy storage device and which can be coupled to the DC link voltage by an interface circuit. The interface circuit is a separate DC-to-DC converter having its own control with current feedback, gate drive and protection functions. The energy storage device can be charged either by regenerative braking or from the propulsion battery. In the system disclosed in the patent, the circuit optimizes the energy extracted from the storage device by requiring that the device be decoupled from the battery and possibly from the DC link. This system requires a complex power electronics interface and control. Accordingly, it is desirable to provide a simple, low cost interface which can provide battery load leveling although not as optimized as the prior patented system.

SUMMARY OF THE INVENTION

One object of the invention is to provide a simplified load leveling system for a battery in an electric drive system.

Another object of the invention is to provide an interface for a passive auxiliary energy storage device which does not require a DC- to-DC converter and associated control.

Another object of the invention is to provide a simple interface for coupling an ultracapacitor to a DC link.

In general, in accordance with a preferred embodiment of the invention, an electric power control arrangement is provided for an electrically propelled vehicle having a battery coupled to a DC link with the DC link coupled to an electronic power regulator for supplying regulated electric power to a motor. An energy storage device, such as an ultracapacitor, is coupled to the DC link by a diode poled to provide a low impedance path from the energy storage device to the DC link. The diode allows the storage device to supplement battery current when battery voltage drops below the voltage of the device plus the diode drop. Recharging of the storage device is through a second current limited path coupled in parallel with the diode. The current limited path includes a current-sensitive resistance or switch and a fixed resistance. At low recharge currents, current passes through the low resistance of the switch with minimal thermal loss. At higher recharge currents, the switch exhibits an impedance higher than the fixed resistance so that current transfers to the fixed resistance path which limits the average magnitude of recharge current. The current-limited path can also include another switched path of lower resistance to allow faster charging during regenerative braking.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE INVENTION

Figure 1:
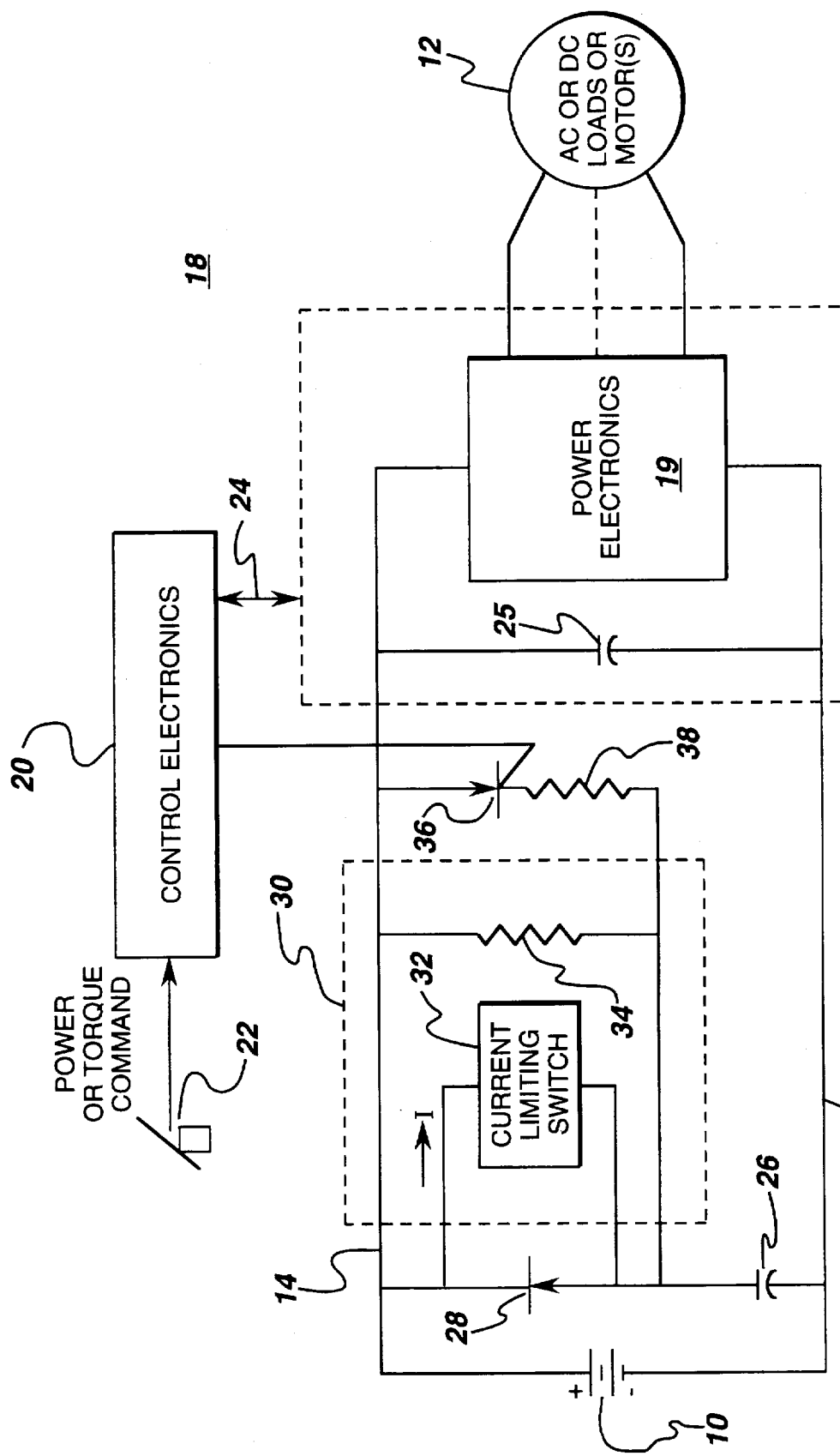
FIG. 1 is a simplified block diagram of an electric drive system incorporating low-cost control of an ultracapacitor.

FIG. 1, illustrates an electric power control system utilizing a battery 10 to supply power to a load 12. Load 12 may be an alternating current (AC) or direct current (DC) load such as an electric traction motor for powering electric vehicles. Positive and negative terminals of battery 10 are connected to respective ones of a positive bus 14 and negative bus 16. Positive and negative buses 14 and 16 comprise a DC link coupling battery 10 to a power electronic circuit 18 which may comprise a switching regulator 19 such as a DC-to-AC inverter for supplying alternating current power to an AC load or AC motor, or a DC chopper or pulse width modulation circuit for providing direct current power to a DC load or DC motor 12. A control electronics circuit 20 responsive to a power or torque command from a throttle 22 provides control signals over a control link 24 to power electronic circuit 18. The control signals energize controllable electronic switching devices within power circuit 18 to imbue the direct current power supplied via the DC link with a regulated voltage or frequency for application to load 12. A DC link capacitor 25 provides filtering of the voltage on the DC link to compensate for voltage spikes generated by switching of the electronic components within switching regulator 19. Details of the construction of power electronic circuit 18 and control electronics 20 are presented in the aforementioned U.S. Pat. No. 5,373,195, the disclosure of which is hereby incorporated by reference.

In the present invention, an ultracapacitor 26 is serially connected with a diode 28 in parallel with battery 10, with diode 28 being poled to conduct current in the same direction as battery 10. Accordingly, if ultracapacitor 26, sometimes referred to as a passive auxiliary energy storage device, is charged to a voltage greater than the instantaneous voltage on battery 10, the ultracapacitor will forward bias the diode and provide current to the DC link. Since ultracapacitor 26 is a passive device capable of storing energy but not of generating energy, there must be provided some means for charging the ultracapacitor during time periods when energy is available from battery 10 or, in the case of an electric vehicle, when the vehicle is in a regenerative braking mode so that electrical energy is being generated by motor 12 and fed back to battery 10, constituting the propulsion battery, through power control 18 onto the DC link. A simple current limiting apparatus 30 allows ultracapacitor 26 to be recharged during time periods when load 12 is not drawing excessive amounts of current. Apparatus 30 includes a current limiting switch 32 and a fixed resistance 34. Current limiting switch 32 is sensitive to current amplitude, and is selected to have a relatively low resistance at low current and a high resistance to high current. Accordingly, when load 12 is drawing a nominal amount of current, battery 10 provides charging current for energy storage device 26 through the relatively low impedance of current limiting switch 32 without dissipating excessive power in the resistance of switch 32. However, if energy storage device 26 has been deeply discharged so that its voltage is substantially less than the nominal battery voltage, increased current I drawn through current limiting switch 32 will cause the switch to transition into a relatively high resistance state selected to be substantially greater than the resistance of fixed resistor 34. Accordingly, the ultracapacitor or energy storage device 26 will be recharged by current through resistance 34. Preferably, the ohmic value of resistance 34 is selected to provide a current level that will recharge the capacitor in approximately thirty to sixty seconds, depending upon battery conditions. Current limiting apparatus 30 thus provides improved load leveling of the battery by preventing high current recharge of ultracapacitor 26 from the battery immediately after the system experiences high power pulse loads due to heavy current draw in load 12 such as would be occasioned by rapid vehicle acceleration where load 12 comprises an AC or DC electric motor. The design of current limiting switch 32 is selected such that the switch does not oscillate as the ultracapacitor 26 charge current exponentially decreases with increasing voltage on the ultracapacitor.

In an electric vehicle application, motor 12 can be operated in a regenerative braking mode when the vehicle is slowing. In this mode, inertia of the vehicle drives the motor as a generator and the generated current can be fed back onto the DC link through power controller 18 to recharge the battery and also to charge ultracapacitor 26. In instances where it is desired to recharge the ultracapacitor using regenerative current, an additional electronic switch, such as a silicon controlled rectifier 36, is coupled in series with a resistor 38 having a relatively low resistance value. The resistance value of resistor 38 can be selected to limit maximum current to that allowed by the ultracapacitor design and the wiring system of the vehicle. Control electronics 20 is coupled to provide a signal to switch 36 during regenerative braking that gates switch 36 into conduction so that the current generated by motor 12 can be supplied to the ultracapacitor. Ultracapacitor 26 can be charged at a very high rate from current generated by motor 12 as compared to availability of current from battery 10 for charging the ultracapacitor during normal vehicle operation. The system of FIG. 1 is designed such that once the voltage on the ultracapacitor exceeds the voltage of battery 10, current from the motor on the DC link will transition automatically into charging current for battery 10. Further, if switch 36 is a silicon controlled rectifier (SCR), the SCR will be automatically gated out of conduction as soon as the voltage on capacitor 26 rises above the voltage on DC link 14.

The simple interface circuit and control technique thus described provides for load leveling of propulsion battery 10 during acceleration of the vehicle without burdening the battery to provide high rates of recharge of ultracapacitor 26 after the vehicle has been accelerated. If the ultracapacitor is simply coupled in parallel to the propulsion battery, the battery would be called upon to recharge the ultracapacitor at a very high current rate which could reduce overall energy storage capability of the battery.

Figure 2:
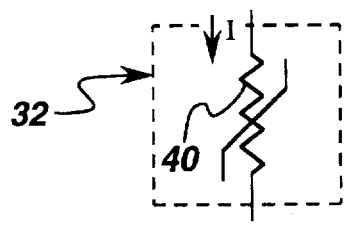
FIG. 2 is a schematic drawing of an exemplary current limiting switch for use in the system of FIG. 1.

FIG. 2, illustrates one embodiment of current limiting switch 32 as a positive temperature coefficient (PTC) resistor 40, such as commercially available resistor comprising a doped polymer that conducts electricity at room temperature. At higher temperatures the molecular structure of the polymer is altered and the resistance increases by several orders of magnitude. In the application of FIG. 1, charging current through the PTC resistor will cause the PTC resistor temperature to increase, thereby increasing its resistance and forcing current to transition into the fixed resistance path formed by resistor 34. After current flow to ultracapacitor 26 has dropped to relatively low values, the PTC resistor temperature will decrease and the PTC resistor will revert back to its normal low resistance state.

Figure 3:
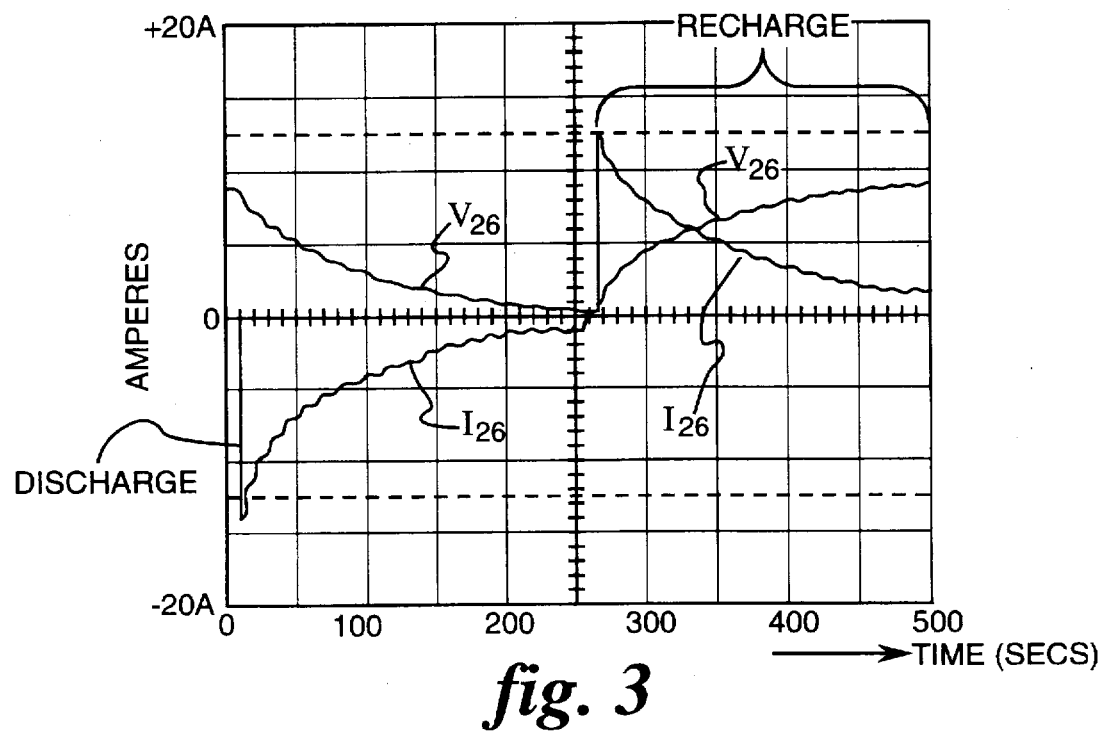
FIGS. 3 and 4 are graphs of voltage and current waveforms associated with operation of the ultracapacitor of FIG. 1 in low and high power modes.

FIG. 3 is a graph of voltage $V_{26}$ and current $I_{26}$ applied to ultracapacitor 26 in a circuit utilizing a PTC resistor 40 (FIG. 2) as current limiting switch 32 when the PTC resistor is a Raychem polyswitch RXE 375 and the ultracapacitor is a 470 farad Panasonic ultracapacitor. The graph is a plot of both voltage and current vs. time under relatively light acceleration of a vehicle, i.e., a relatively low power pulsed load. At this low power load, there is a relatively small voltage difference between the partially discharged ultracapacitor 26 and the nominal voltage of battery 10, and current limiting switch 40 (FIG. 2) remains in a low resistance state during both discharge and recharge modes. Essentially, PTC resistor 40 keeps the ultracapacitor in parallel with the battery.

Figure 4:
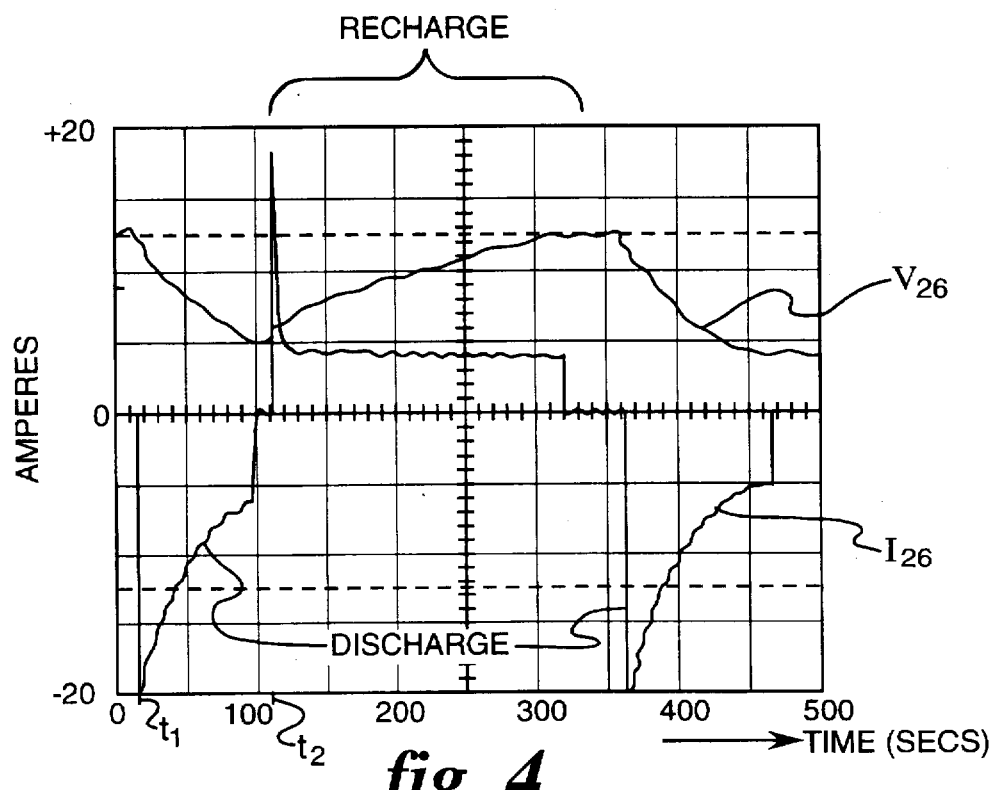

FIG. 4 graphically illustrates ultracapacitor current for a relatively high power pulsed load representing a vehicle undergoing aggressive acceleration. Here, the pulsed load current, approximately 20 amps at time $t_1$, was conducted through the parallel combination of diode 28 and current switch 32 (FIG. 1). After switching off the load, the ultracapacitor was initially recharged for a short time (beginning at time 12) at approximately 18 amps through the relatively low resistance of PTC resistor 40. Within approximately five seconds, the PTC resistance had heated sufficiently to cause it to transition to its high resistance state and the ultracapacitor was thereafter recharged at approximately four amps from the battery through resistance 34. Accordingly, this circuit performed a load leveling function by allowing the high pulsed load current to be supplied from ultracapacitor 26 primarily through diode 28 while a potential of high average magnitude current during recharge of ultracapacitor 26 was avoided by the current limiting action of PTC resistor 40.

Figure 5:
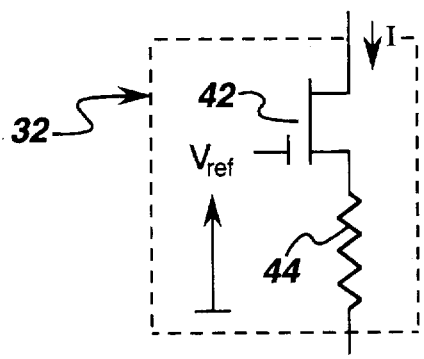
FIG. 5–7 schematically illustrate alternative embodiments of the current limiting switch of FIG. 1.

FIG. 5 illustrates an alternative embodiment of current limiting switch 32 utilizing a metal-oxide-semiconductor filed effect transistor (MOSFET) 42 connected in a source follower configuration with a resistor 44 connected in its source circuit. In this configuration, as current through MOSFET 42 increases, the difference between the source terminal voltage and a fixed voltage reference $V_{ref}$ on the transistor gate terminal will reduce the forward bias potential on the transistor, forcing it into a current limiting state. In this state, MOSFET 42 appears to have a high impedance, forcing ultracapacitor 26 charging current to pass through fixed resistance 34.

Figure 6:
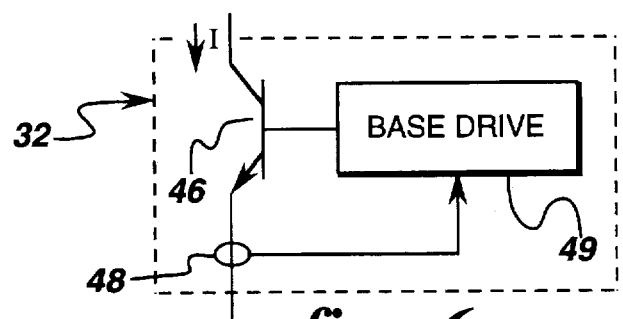

FIG. 6 represents another embodiment of current limiting switch 32 utilizing a bipolar transistor 46 having a current sensor 48 coupled to its emitter terminal with the output of the current sensor being applied to a base drive circuit 49 to modify the transistor 46 base drive current. As the current I increases, the base drive is modified to reduce the forward biasing of transistor 46, causing it to transition to a high impedance state.

Figure 7:
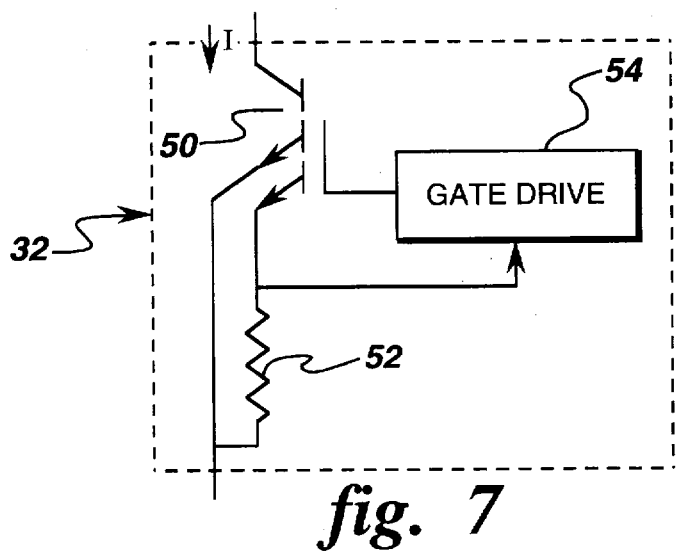

FIG. 7 represents another embodiment of current limiting switch 32 utilizing an insulated gate bipolar transistor 50 with a current sensing pilot resistor 52 coupled in its emitter circuit. Transistor 50 operates in the same manner as transistor 46 of FIG. 6 so that the increased voltage on resistor 52 modifies the gate drive applied to the transistor by a gate drive circuit 54, causing transistor 50 to transition to a high impedance state with higher values of current.

Each of the implementations of current limiting switch 32 shown in FIGS. 5–7 are simple, low cost configurations which enable the circuit of FIG. 1 to utilize the ultracapacitor without the expensive electronic components illustrated in the prior art patents. While the system of FIG. 1 utilizing the low cost components does not provide the same optimization and efficiency as the aforementioned U.S. Pat. No. 5,373,195, it does provide essentially the same function in a less complex, low cost version with only a small reduction in circuit efficiency.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A battery load leveling arrangement for an electrically powered system in which battery loading is subject to intermittent high current loading, the system including a battery, a load and a system controller coupled to the battery and load for controlling application of power to the load, the improvement comprising:

a passive energy storage device;

unidirectional conducting means coupled in series electrical circuit with said passive energy storage device and poled to conduct current from said storage device to the load, said series electrical circuit being coupled in parallel electrical circuit with the battery whereby said passive energy storage device provides current to the load and the battery when battery terminal voltage is less than voltage on said passive energy storage device by an amount at least equal to a voltage drop across said unidirectional. conducting means; and current limiting means connected in electrical parallel circuit with said unidirectional conducting means for providing an electrical current path for recharge current to said passive energy storage device and for limiting the average magnitude of recharge current to said device, said current limiting means comprising a current limiting switch in electrical parallel circuit arrangement with a resistor, said current limiting switch being operable to switch to a high impedance condition in response to recharge current above a selected average magnitude so as to divert said recharge current through said resistor.

2. The battery load leveling arrangement of claim 1 wherein said current limiting switch comprises a positive temperature coefficient resistance.

3. The battery load leveling arrangement of claim 1 wherein said passive energy storage device comprises an ultracapacitor.

4. The battery load leveling arrangement of claim 1 wherein said current limiting switch comprises a metal-oxide-semiconductor field effect transistor connected in a source follower configuration.

5. The battery load leveling arrangement of claim 1 wherein said current limiting switch comprises a bipolar transistor and current sensing means coupled to modulate base drive current of said transistor in a manner to limit current through said transistor.

6. The battery load leveling arrangement of claim 1 wherein said current limiting switch comprises an insulated gate bipolar transistor (IGBT), a current sensing pilot resistor coupled to an emitter terminal of said IGBT, and a gate drive circuit responsive to voltage on said pilot resistor for providing a current signal to modulate base drive current in said IGBT in a manner to limit current through said IGBT.

7. The battery load leveling arrangement of claim 1 and including a controllable switching circuit coupled in parallel electrical circuit with said current limiting means, said controllable switching circuit being operable to provide a low resistance recharge current path to said passive energy storage device.

8. The battery load leveling arrangement of claim 7 wherein said load comprises an electrical motor operative in a propulsion and a regenerative braking mode, said controllable switching circuit being operable in said regenerative braking mode for transferring regenerative current from said motor to said energy storage device.

9. The battery load leveling arrangement of claim 8 wherein said controllable switching circuit comprises a silicon controlled rectifier.

10. A battery load leveling system for use in a control system for an electric traction motor, the control system including a battery, an electronic power regulator for regulating power applied to the motor in response to a power command signal, said power regulator being coupled to receive power from said battery, the improvement comprising:

an ultracapacitor;

a diode coupled in series electrical circuit with said ultracapacitor, the series combination of the diode and ultracapacitor being coupled in parallel electrical circuit with said battery, said diode being poled to block current from the battery to the ultracapacitor; and a current limiting switch coupled in parallel electrical circuit with said diode and comprising a positive temperature coefficient (PTC) resistance and a fixed resistor coupled in parallel electrical circuit with said PTC resistance, said current limiting switch having a relatively low resistance for relatively low magnitudes of current and having a relatively high resistance for relatively high magnitudes of current so as to facilitate recharging of the ultracapacitor with relatively low current through said current limiting switch.

11. A battery load leveling system for receiving power from a battery, comprising:

an ultracapacitor;

a diode coupled in series electrical circuit with said ultracapacitor, the series combination of the diode and ultracapacitor being coupled in parallel electrical circuit with said battery, said diode being poled to block current from the battery to the ultracapacitor;

a current limiting switch coupled in parallel electrical circuit with said diode, said current limiting switch having a relatively low resistance for relatively low magnitudes of current and having a relatively high resistance for relatively high magnitudes of current so as to facilitate recharging of the ultracapacitor with relatively low current through said current limiting switch; and a control system for an electric traction motor and a controllable switching circuit coupled in parallel electrical circuit with said current limiting switch, said control system being responsive to power or torque commends and further controlling impedance of said controllable switching circuit so as to provide a low resistance recharge current path to the ultracapacitor for battery load leveling.

12. The battery load leveling system of claim 11 wherein the current limiting switch comprises a positive temperature coefficient (PTC) resistance and a fixed resistor coupled in parallel electrical circuit with said PTC resistance.

\* \* \* \* \*